Figure 3B:
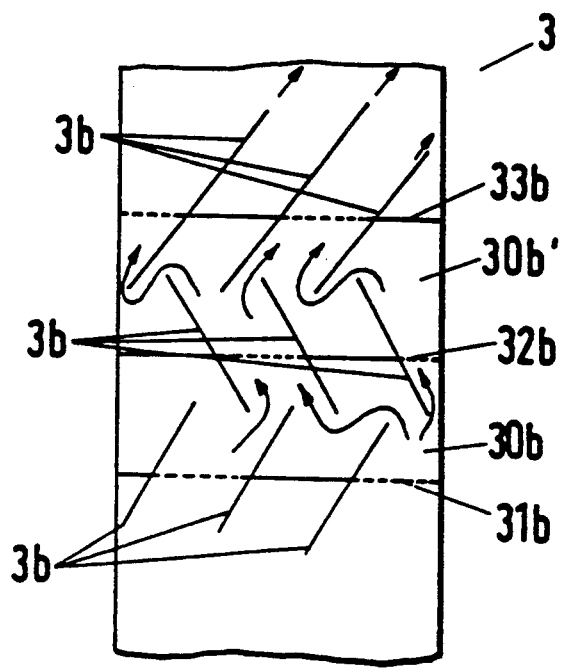

United States Patent [19]

Streiff

[11] Patent Number: 5,320,428
[45] Date of Patent: Jun. 14, 1994

[54] MIXER INSTALLATION, CATALYZER INSTALLATION AND USE OF THE CATALYZER INSTALLATION

[75] Inventor: Felix Streiff, Winterthur, Switzerland

[73] Assignee: Sulzer Chemtech AG, Winterthur, Switzerland

[21] Appl. No.: 807,840

[22] PCT Filed: May 7, 1991

[86] PCT No.: PCT/CH91/00109
§ 371 Date: Aug. 28, 1992
§ 102(e) Date: Aug. 28, 1992

[87] PCT Pub. No.: WO91/16970
PCT Pub. Date: Nov. 14, 1991

[30] Foreign Application Priority Data
May 8, 1990 [CH] Switzerland .................. 01563/90

[51] Int. Cl.⁵ .............................. B01F 5/06
[52] U.S. Cl. ....................... 366/337; 366/340
[58] Field of Search ............... 366/337, 336, 340, 338, 366/339; 138/38, 42

[56] References Cited

U.S. PATENT DOCUMENTS

| | | |
|---|---|---|
| 3,582,048 | 6/1969 | Sarem . |
| 4,170,446 | 10/1979 | Kocher .................. 366/337 |
| 4,220,416 | 9/1980 | Brauner ................. 366/337 |
| 4,497,751 | 2/1985 | Pluss .................... 366/337 |
| 4,527,903 | 7/1985 | Ruscheweyh .......... 366/337 |

FOREIGN PATENT DOCUMENTS

| | | |
|---|---|---|
| 3705476 | 10/1987 | Fed. Rep. of Germany . |
| 2227041 | 11/1974 | France . |
| 2336164 | 7/1977 | France . |
| 149676 | 5/1921 | United Kingdom . |

Primary Examiner—Robert W. Jenkins
Attorney, Agent, or Firm—Kenyon & Kenyon

[57] ABSTRACT

The mixer installation contains duct components (21), which are disposed in the tower (2) in layers or beds (22, 23 24). The duct components (21) of a layer (22, 23, 24) and/or successive layers (22, 23 24) in the direction of flow of the flow material are angularly inclined with respect to one another and comprise parallel ducts (20) open to the tower clearance (20). The surfaces of the components (21) and of the ducts (210) of these components (21) may be coated with catalyzers. The plant for the removal of nitrogen from flue gas contains such components (21) provided with a surface coating having a catalytic effect.

16 Claims, 3 Drawing Sheets

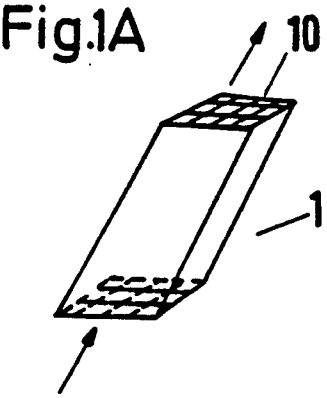
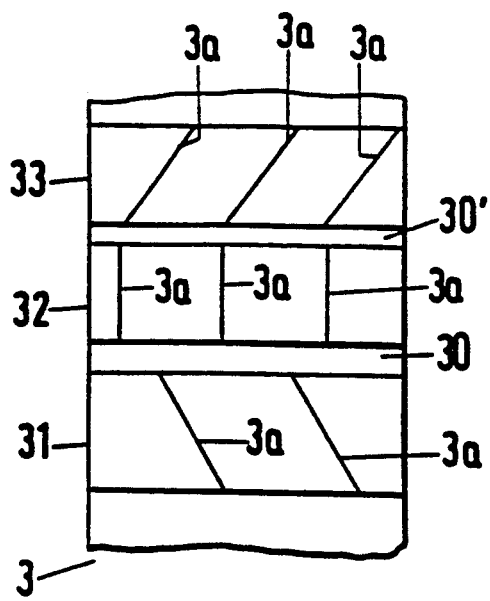
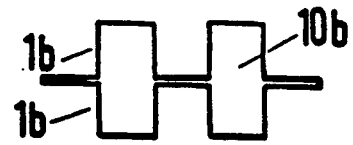
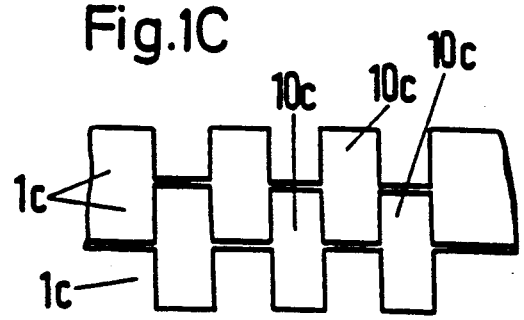
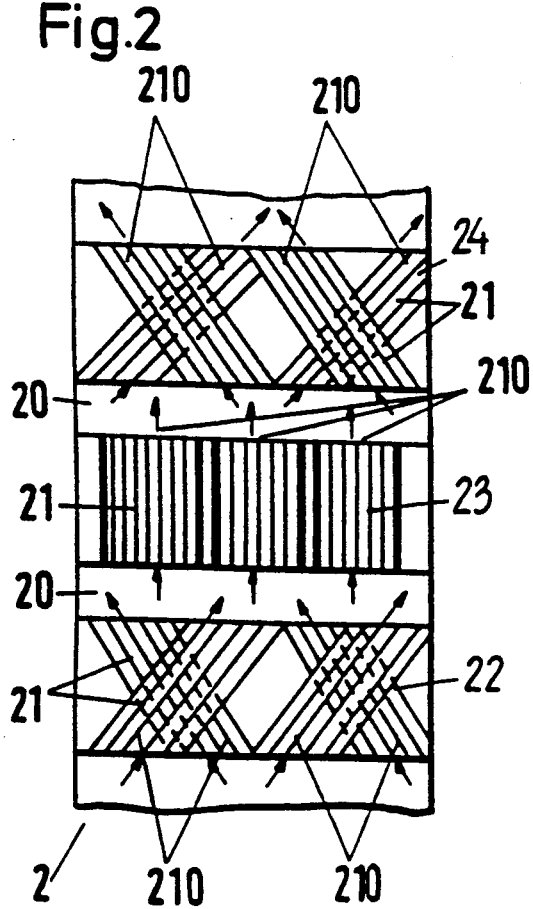
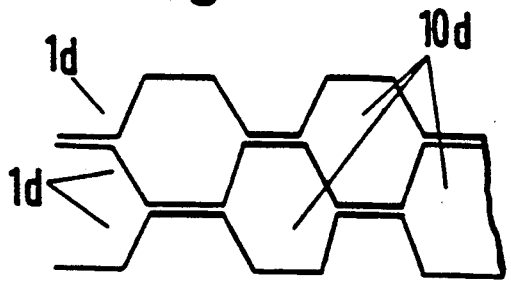

MIXER INSTALLATION, CATALYZER INSTALLATION AND USE OF THE CATALYZER INSTALLATION

The invention relates to a mixer installation, a catalyzer installation in towers and the use of such catalyzer installations.

In so-called fixed mixers of a known design, the mixing components are disposed in the mixing towers in such a way that the flow material or material to be mixed is mixed as homogenously as possible. The material to be mixed may consist of gaseous, liquid or solid constituents, or a mixture thereof, and it is also possible to have various phases/physical states of a single substance or individual substances to be mixed. Very many different types of mixing components are known, and they may also be used as cooling or heating components.

Fixed mixers are also used to mix constituents which are intended to react with one another, e.g. to ensure that the reactants react as uniformly and/or as completely as possible. The aim of each installation of mixing components should always be to achieve a relatively high mixing efficiency of the constituents with a relatively low resistance to flow in the main direction or direction of flow of the tower or the mixer.

The mixing efficiency of previous fixed mixer installations depends on the external shape or contours of the individual mixing components and their mutual arrangement. Such installations often have too great flow resistance values, and it is only possible to reduce them at the expense of a thorough mixing of the constituents.

The object of the invention is to create a mixer tower which has a low resistance to flow for the material to be mixed together with good mixing efficiency. Further objects of the invention are to create a catalyzer installation with good mixing efficiency for the reactants and the application and/or use of such catalyzer installations having good mixing efficiency. The invention also relates to a layer having mixing components for a catalyzer installation.

According to the invention such a mixer installation is characterised by the features of the first claim. The catalyzer installation is characterised by the features of the dependent claim 11. The use of the catalyzer installation is characterised by the features of claim 16. The layer comprises catalyzer-coated mixing components. The dependent claims relate to advantageous refinements of the subject matter of the invention.

The resistance to flow is considerably reduced by the mixing components in the tower being provided with ducts, without the mixing efficiency being substantially impaired. Partial flows are displaced to and fro over the cross section and are lightly mixed by the duct components which are alternately inclined towards the main flow direction. In the region where the duct components and the tower clearance meet, mixing efficiency is promoted by additional eddies and the meeting of various partial flows. When several successive duct components made of catalyzer monoliths are installed in the tower, the repeated flow of flow materials in and out of the ducts and the meeting of the flows in the tower clearance contribute towards an improvement in the mixing of the reactants. Furthermore the efficient utilisation of the catalyzer and the throughput is improved by the extension of the flow path, the inclination of the duct components and the increase in turbulence. Finally all this contributes towards an improvement in the course of the catalytic reaction and a reduction in the slip of the reactants (e.g. NH3 slip in Denox catalyzers).

The mixer or catalyzer components or the duct components hereinafter referred to simply as "components"—may be disposed in beds or layers. Adjacent components within a layer or bed and successive components in adjacent layers are advantageous disposed so that they are inclined with respect to one another. The mixing and/or catalyzer components of successive layers or beds are fixed in the tower so that they are twisted with respect to one another, for example.

The spaces between the components in the tower clearance may be completely or partly filled with filler or deflector members or partitions may be provided to convey the flow material completely or to a certain extent through the ducts of the mixing components, which may be advantageous with catalyzer installations, for example. It is also possible to arrange components so that the ends of the components of successive layers overlap one another when viewed towards the tower.

The ducts in the components may extend parallel to one another. However this does not preclude the cross section of individual ducts changing, e.g. periodically changing. It is also possible for the ducts of a component to be helically twisted with respect to one another and/or for ducts—seen in the tower direction—to begin in the same or different planes in the tower clearance. Therefore the ducts of the components—when looking towards the tower—may open into the same or different planes of the tower clearance or begin in the same or different planes of the tower clearance. It is always essential that the flow material always reaches the tower clearance before it reaches the ducts of a subsequent component.

The components provided with ducts may be made of metal, ceramics, glass or plastic or a combination of several such materials. The mixing of catalytic mixing components may be manufactured and accordingly assembled as coiled members.

For the removal of nitrogen from flue gasses, NH3, for example, is added in dosed amounts to reduce NOx and is made to react as uniformly and as completely as possible in the catalyzer device so that the removal process can proceed stoichiometrically and completely.

A tower for the removal of nitrogen from flue gas in a refuse incineration plant or a power station, i.e. for the reduction of NOx with NH3, for example, contains duct and/or catalyzer components, for example, with a coating of oxides of alkaline-earth metals or off-grade metals.

A particularly favourable and versatile embodiment is achieved by providing the duct components with a catalytically effective wash coat.

The invention is explained below by means of the diagrammatic drawings, with examples of possible duct and catalyzer components and possible arrangements of duct and/or catalyzer components in towers.

Figure 4:
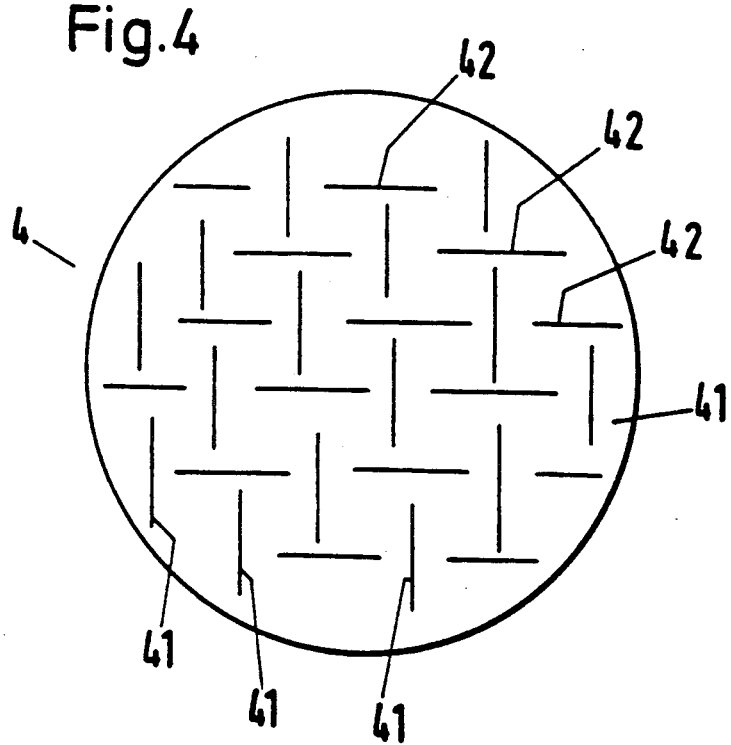

They show:

FIG. 1a—a component having a honeycomb structure and ducts having a rectangular cross section;

FIG. 1b-1d three further duct structures;

FIG. 2 an arrangement of components as shown in FIG. 1a in two layers in a tower;

FIGS. 3a and 3b lateral elevations of further diagrammatic arrangements of the components in towers;

FIG. 4 is a plan view of a cross section through a tower with components.

Figure 5:
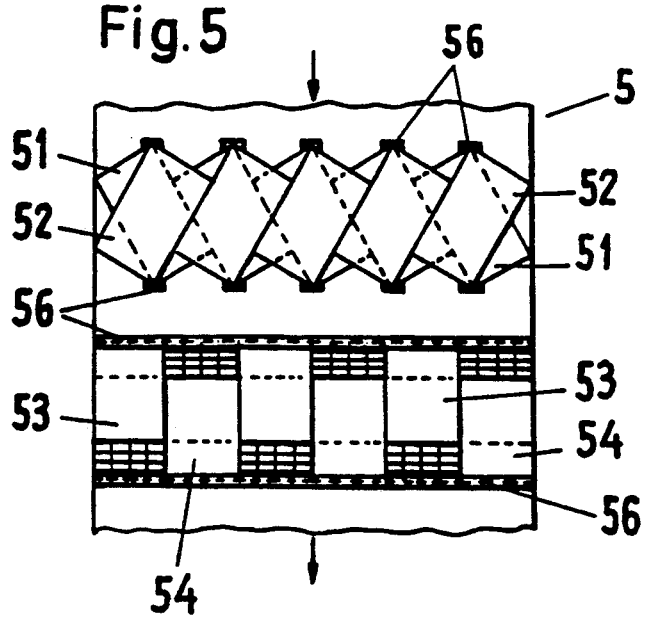
Figure 6:
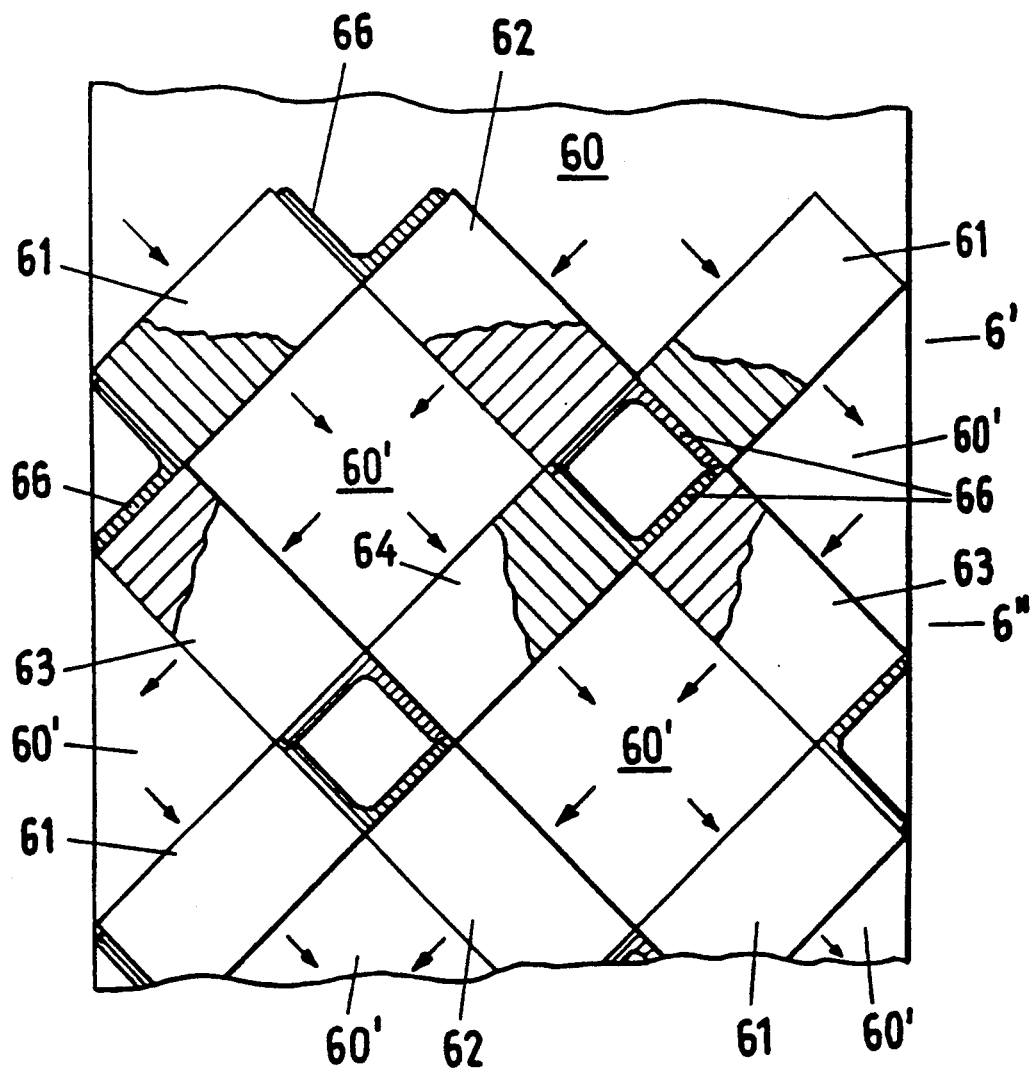

FIG. 5 in a diagrammatic lateral elevation two successive layers with components arranged crossed;

FIG. 6 in a diagrammatic lateral elevation two successive layers with platelike components which together form partial tower clearances.

Components 1 in FIG. 1a is shaped like an inclined prism. Ducts 10 in component 1 have a square cross section and extend straight and parallel.

FIGS. 1b, 1c and 1d show examples of other possible cross sections for ducts 10b, 10c and 10d. Components having such a structure could be made by joining structured plates 1b, 1c or 1d. However it is also possible to obtain components structured in such a way be extrusion.

In the diagrammatic lateral elevation of FIG. 2 can be seen the arrangement of components 21 in the tower 2 in beds or layers 22, 23, 24. After leaving the beds or layers 22, 23, 24, the flow material or material to be mixed (shown by arrows) travels from the ducts 210 of components 21 into the open tower clearance 20. The components 21 in the layers 22, 23, 24 are sloped with respect to one another and layers 22, 23, 24 are also twisted anularly with respect to one another, by an angle of approximately 90° in the example shown. Inside a single layer 22, 23, 24 adjacent components 21 are also inclined with respect to one another.

It is possible for the flow material to flow completely, only partially or not at all through the tower clearance inside the layers, i.e. the clearance not within the components, i.e. outside the ducts. In cases in which material flows through this clearance, the external contours of the components 21 may also have a mixing and/or catalytic effect. However there is also the possibility of mounting filling material or baffle plates for the flow material in these clearances.

In the lateral elevations of FIGS. 3a and 3b of towers 3 showing further configurations of components, components 3a and 3b respectively are only shown by straight lines.

The outlets of the ducts of the components 3a in the layer 31 of FIG. 3a do not open, for example, into the tower clearance opposite the inlets of the ducts of components 3a of layer 32. However the outlets and the inlets of the ducts of components 3a of layers 32 and 33 open into the tower clearance 30' opposite one another.

In FIG. 3b the components 3b are disposed so that they overlap towards the tower. This forces the flow material into paths in the tower clearances 30b and 30b' shown by curved arrows if, for example, the bases of the layers 31b, 32b, 33b are partially impervious to the flow material or only slightly pervious or of differing permeability. With differing permeabilities of the bases of the layers to the flow material any amount of different construction are conceivable. It is merely the principle which is to be made clear by FIG. 3B.

Finally FIG. 4 shows the cross section through a tower 4 having components 41, 42 which are twisted at right angles to one another. In this case the components 41, 42 could all be incorporated in one layer or in different layers in the tower. Furthermore filler material, deflector members or baffle plates could be provided in the tower clearance to influence the path of the flow material.

FIG. 5 shows an arrangement of components 51, 52 in the form of plates which, arranged in rows at an angle to one another, form one layer. The layer is built up of a plurality of rows of such components so that the cross-section of the tower 5 is completely covered by the layer. The components 53, 54 of the next layer are here, for example, twisted with respect to one another through 90°.

The components 51, 52 or respectively 53, 54 of the individual layers are laid in and secured after the style of U-profiles.

The principle of the arrangement from FIG. 6 finally shows components in the form of plates, 61, 62 and 63, 64 respectively, of two successive layers. Each single component 61, 62, 63 and 64 forms in that case a partial clearance 60 of the tower clearance. In the components the ducts are so arranged that the flow material travels through the ducts in the components 61 and 62 of the first layer into the partial clearance 60 and flows through the ducts in the components 63, 64 in the next two layers into the next partial clearances 60'. The path of the flow material is shown by arrows. The components are fitted into the tower by the angleiron bearers 66.

The component could also be a coiled component which is produced by winding or rolling a structured plate and in which parallel ducts, for example, have been formed according to the structure of the wound plate.

I claim:

1. A mixer installation in a tower defining an axis which is substantially parallel to a direction of flow through the tower, wherein the tower has a plurality of mixer components arranged in layers along the axis, each mixer component being disposed at an angle relative to the angle of mixer components in adjacent layers and wherein each mixer component has at least one inlet duct and at least one outlet duct, each duct being open to a tower clearance.

2. A mixer installation according to claim 1, having at least two mixer components which are disposed at an angle relative to the axis, wherein a transitional region is located between adjacent layers of mixer components.

3. A mixer installation according to claim 1, wherein at least one of the mixer components is disposed at an angle relative to the axis, wherein the angle is within the range of 20° to 70°.

4. A mixer installation according to claim 1, in which a mixer component in one layer is rotated about the axis relative to a mixer component in an adjacent layer.

5. A mixer installation according to claim 1, in which the outlet duct of one mixer component is disposed opposite to the inlet duct of an adjacent mixer component.

6. A mixer installation according to claim 1, in which the outlet duct of one mixer component is displaced with respect to inlet duct of an adjacent mixer component.

7. A mixer installation according to claim 1, in which the outlet duct of one mixer component extends axially past the inlet duct of an adjacent mixer component.

8. A mixer installation according to claim 1, in which at least one of the mixer components is arranged in a honeycomb pattern.

9. A mixer installation according to claim 1, in which the mixer components in adjacent layers and the mixer components within the layers are arranged with respect to one another so that together they form a largely closed partial clearance of the tower clearance and, wherein the flow material enters this partial clearance via the ducts in the mixer components of one of the adjacent layers which defines the partial clearance and, wherein the flow of material leaves this partial clearance via the ducts in the mixer components of the other adjacent layer.

10. A mixer installation according to claim 1, in which at least one mixer component includes a plurality of inlet ducts and a plurality of outlet ducts, and wherein the inlet ducts of this mixer component run in parallel with one another and the outlet ducts of this mixer component extend parallel to one another.

11. A mixer installation according to claim 10, wherein one layer of mixer components is coated with a catalyzer, and wherein these coated mixer components include open ducts.

12. A mixer installation according to claim 1, in which at least a portion of one of the mixer components is constructed as a catalyzer.

13. A mixer installation according to claim 12, wherein portions of at least two mixer elements are constructed as catalyzers and wherein the tower clearance between these two mixer elements has filler material therein.

14. A mixer installation according to one of claims 12 to 13, wherein the tower is included in a plant for the removal of nitrogen from flue gas.

15. A mixer installation according to claim 14, wherein the tower is included in a plant for the removal of nitrogen from flue gas.

16. A mixer installation according to claim 12, in which the portion of the surface of the mixer component which is constructed as a catalyzer comprises a catalytically active wash coat.

* * * * *